June 17, 1958     I. H. DUNHAM     2,839,696
MOTOR DRIVE FOR DENTAL TOOLS
Filed Oct. 17, 1952     2 Sheets-Sheet 1
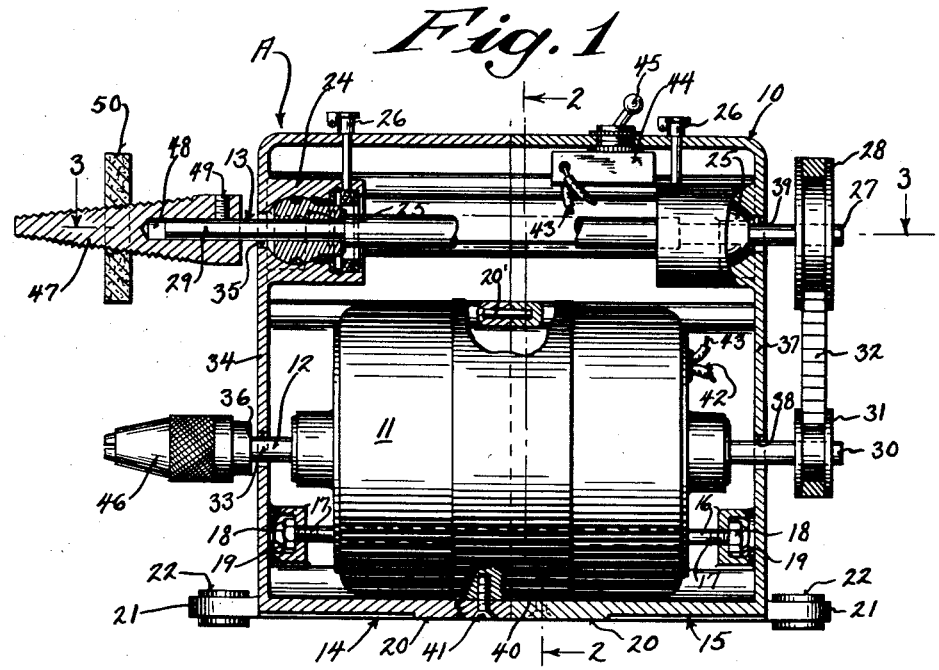
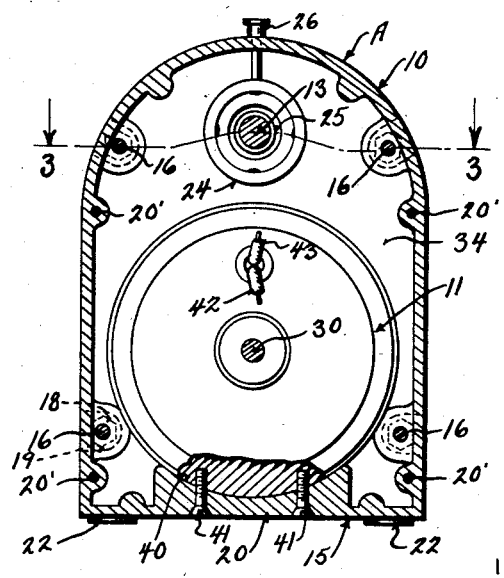
INVENTOR
IRVIE H. DUNHAM
BY
ATTORNEYS

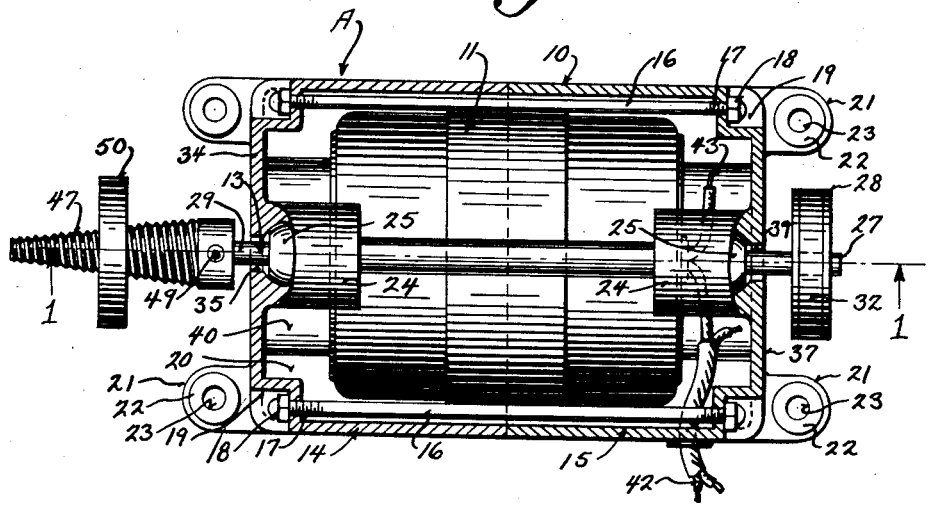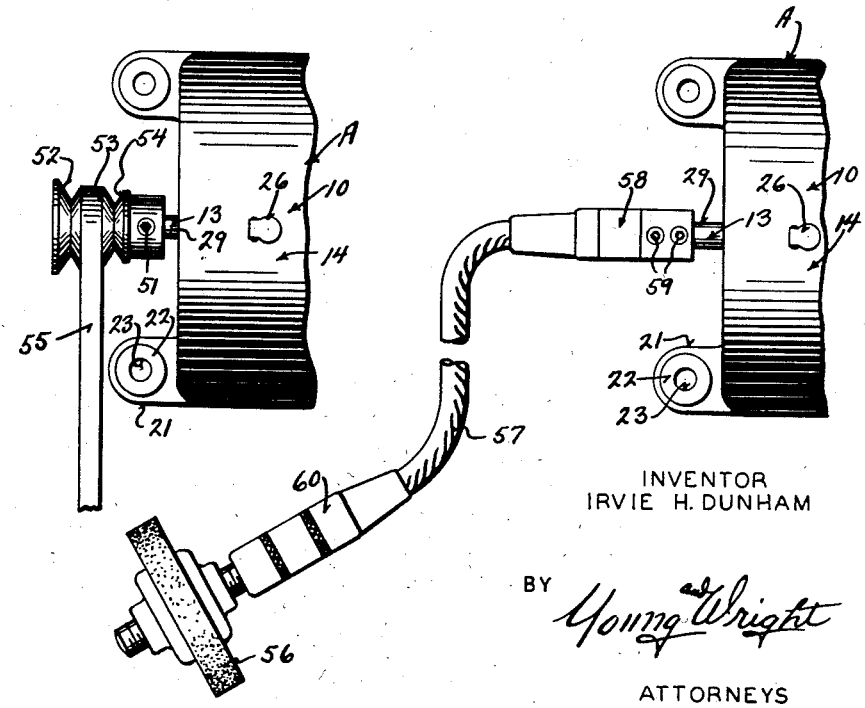
INVENTOR
IRVIE H. DUNHAM
BY Young Wright
ATTORNEYS

United States Patent Office 2,839,696
Patented June 17, 1958

2,839,696

MOTOR DRIVE FOR DENTAL TOOLS

Irvie H. Dunham, Racine, Wis., assignor to Rae Motor Corporation, Racine, Wis., a corporation of Wisconsin Application October 17, 1952, Serial No. 315,378

2 Claims. (Cl. 310—89)

This invention relates to motor drives and more particularly to a novel motor drive unit for dental offices and the like.

A primary object of my invention is to provide a novel casing for a compact motor drive unit which is particularly adapted for dental tools and the like and for performing all types of small precision work.

Another object of my invention is to provide my casing with means in which the motor drive shaft and the driven shaft are positioned in an accurate and efficient manner in relation to one another to provide a speed reduction between the two shafts without the need of gears, etc.

Still another object of my invention is to form my novel casing in two identical mating pieces which may be quickly and easily separated or secured in position with the mating bases forming an arcuate cradle for receiving the motor.

A further object of my invention is to adapt the outer forward ends of the drive and driven shafts to receive a great variety of attachments, such as chucks, buff arbors, flexible drives and the like for performing a variety of jobs.

An important feature of my invention resides in the novel means of joining the mating pieces of the casing whereby in addition to the guide pins and elongated rod bolts, the motor itself is firmly secured to each respective piece; thereby, not only holding the motor against movement, but the motor also adds strength to the casing.

A still further object of my invention is to provide a portable motor drive unit of an attractive appearance and of a comparatively small size, and one which can be placed upon the market at a reasonable cost, and one which will be durable and efficient in use.

With these and other objects in view and to the end of attaining any other advantages hereinafter appearing, the invention consists in the features of construction and combination of parts hereinafter described, pointed out in the claims and illustrated in the accompanying drawings.

In the same drawings:

Figure 1 is a side vertical sectional view of my novel motor drive unit illustrating in particular the position of the motor and the accurately aligned drive and driven shafts with two different tool attachments secured thereto, the section being taken on the line 1—1 of Figure 3 and looking in the direction of the arrows;

Figure 2 is a transverse sectional view taken on the line 2—2 of Figure 1 looking in the direction of the arrows and showing in particular the arcuate cradle in the base for supporting the electric motor;

Figure 3 is a top plan view of my unit, partly in section, the section being represented by the lines 3—3 of Figure 1 and 3—3 of Figure 2 looking in the direction of the arrows;

Figure 4 is a fragmentary top plan view of the forward end of my motor drive unit showing an attachment secured to the driven shaft which adapts the unit to drive a small lathe; and Figure 5 is a fragmentary top plan view similar to Figure 4 of the drawing but illustrating how a flexible drive can be secured to the driven shaft.

Referring now to the drawings in detail, wherein similar reference characters designate corresponding parts throughout the several views, the letter A generally indicates one type of my improved motor drive unit and the same includes broadly a casing 10, motor 11, a motor drive shaft 12, and a driven shaft 13.

An important feature of the present invention resides in the novel formation and structure of the casing 10 and it is to be noted that the casing is formed from two identical mating pieces 14 and 15 which are joined together by means of four elongated rods 16 which extend through the interior of the casing to the outer portion thereof. The respective ends 17 of rod 16 are externally threaded to receive the nuts 18, and in order to add further strength and stability to the casing I provide the mating ends 20 with four pins 20' which are received in the mating portions as shown. It is to be noted that the casing is formed with indentations 19 into which the respective end of each rod 16 is extended and which receives the nuts 18.

The base 20 of the casing is provided with four longitudinally extending feet 21 into which rubber gaskets or cushioning members 22 are fixed. The cushioning members 22 having a central opening therethrough at 23 so that the unit may be resiliently bolted to a surface if desired. The inner upper portion of each half 14 and 15 respectively is provided with a bearing housing 24 which carries the bearing 25 and the same may be lubricated by inducing oil through a capped oil spout 26. Received in the bearings 24 is the horizontally positioned driven shaft 13. The rear portion 27 of the shaft 13 is provided with a relatively large pulley 28 and the front end 29 is adapted to carry any of a number of attachments to be utilized in dental work.

The motor drive shaft 12 is positioned below the driven shaft 13 and is parallel to shaft 13 and it is to be noted that the central axis of the shafts 12 and 13 lie in the same vertical plane. This accurate positioning of the shaft is important in that it increases the efficiency and utility of the motor unit. The rear end 30 of drive shaft 12 is also provided with a pulley 31 of a smaller circumference than the pulley 28 and the two pulleys are in drive connection by means of the belt 32. Thus a speed reduction is imparted to the driven shaft 13 without the need for costly gearing and the like.

It is also to be noted that the forward ends 29 and 33 of the shafts 12 and 13 respectively extend outwardly from the forward face 34 of the casing through suitable apertures 35 and 36 respectively and that the rear portions 30 and 27 of the shafts 12 and 13 respectively extend rearwardly from the rear face 37 of the casing 10 through suitable apertures 38 and 39.

Another important feature of my invention resides in forming the base 20 of the casing 10 with an elongated arcuate shaped seat 40 which snugly receives the lower portion of the motor 11 to firmly hold the same against turning movement and for additional strength, each half 14 and 15, at a point adjacent each opposed mating end respectively is provided with a pair of bolts 41 which extend into the motor and firmly hold the same in its arcuate seat 40. The motor 11 is of a conventional type now on the market and includes the wiring 42 leading to any suitable source of electric power and the wiring 43 which leads to the switch unit 44 of the type having a hand manipulated button 45.

As previously stated, the accurate positioning of the drive shafts 12 and 13 adapt my motor drive unit to various uses and the forward ends 29 and 33 respectively provide two different speeds of rotation and are adapted to receive a number of attachments. For example, in Figure 1 of the drawings I have illustrated a chuck 46 detachably secured to the forward end 33 of the motor drive shaft 12 to hold various types of tools depending on the particular job to be done. In Figures 1 and 3 of the drawings I have illustrated a novel buff arbor attachment which is secured to the forward end 29 of the shaft 13, similar to the chuck 46, and the same includes a conically shaped threaded body 47 having a longitudinal central bore 48 which opens out on the rear portions of the body and which snugly receives the shaft 13. The arbor is held in place by tightening the machine screw 49. Threadedly received on the arbor body 47 is the buffing disc 50 and this disc is used to buff or polish small dental parts.

Referring now to Figure 4 of the drawings, I have illustrated an attachment for the front portion 29 of the shaft 13 which is also secured by means of a set screw 51 and which is provided with three ways 52, 53, and 54 which in effect provides a three speed pulley wheel for driving a small lathe or the like through a drive belt 55.

Figure 5 of the drawings illustrates another attachment for the forward end 29 of the shaft 13 which includes a grinding or polishing wheel 56 of any suitable abrasive material which is driven by means of a flexible cable drive 57 by firmly attaching one end 58 to the driven shaft 13 by tightening the machine screws 59. In this type of attachment I provide a handle portion 60 which may be held in the hand during the grinding operation. Of course it is obvious that other attachments may be substituted for the grinding wheel 56 on the end 60 of the flexible drive cable 57.

From the foregoing it is believed that the features and advantages of the invention will be readily apparent to those skilled in the art and it will, of course, be understood that changes in the form, proportion, and minor details of construction may be resorted to without departing from the spirit of the invention or the scope of the appended claims.

I claim:
1. A substantially rectangular casing assembly, for a motor drive unit for dental tools and the like of the type having a rounded electric motor housing and a pair of spaced parallel tool driving shafts comprising; two mating sections providing top, bottom, side and end walls, the bottom inner surface of each section being arcuate in shape and forming with the mating section a continuous cradle to receive said rounded electric motor housing, means for holding said motor housing to said cradle, the respective end wall of each casing having a pair of aligned openings therethrough to receive the respective ends of said pair of tool driving shafts and to accurately position said shafts in said casing, and means for detachably securing the two mating sections together.

2. A substantially rectangular casing assembly, for a motor drive unit for dental tools and the like of the type having a rounded electric motor housing and a pair of spaced parallel tool driving shafts comprising; two mating sections providing top, bottom, side and end walls, the bottom inner surface of each section being arcuate in shape and forming with the mating section a continuous cradle to receive said rounded electric motor housing, means for holding said motor housing to said cradle, the respective end wall of each casing having a pair of aligned openings therethrough, a bearing in each section adjacent the upper portion of the end wall in alignment with the upper opening, and means for detachably securing the two mating sections together, whereby the two tool driving shafts and the motor housing may be accurately positioned in said casing.

References Cited in the file of this patent

UNITED STATES PATENTS

| 1,217,815 | Payne | Feb. 27, 1917 |
| 1,782,927 | Knowlson | Nov. 25, 1930 |
| 1,817,216 | Uggla | Aug. 4, 1931 |
| 1,869,223 | Peck | July 26, 1932 |
| 2,207,219 | Heyer | July 9, 1940 |
| 2,650,993 | Brown et al. | Sept. 1, 1953 |

FOREIGN PATENTS

| 575,597 | France | Apr. 24, 1924 |